United States Patent Office 2,842,120
Patented July 8, 1958

2,842,120

MATERIAL FOR AN ORTHOPEDIC CAST AND PROCESS OF MAKING THE SAME

Andrew J. Foglia, Brooklyn, N. Y., David F. Smith, Metuchen, N. J., and Earl B. Detwiler, Old Greenwich, Conn., assignors, by mesne assignments, to Johnson & Johnson, New Brunswick, N. J., a corporation of New Jersey No Drawing. Application April 15, 1953
Serial No. 349,094

5 Claims. (Cl. 128—91)

The invention in this case relates to orthopedic bandages and to the method of preparing the same. Furthermore, this invention relates to a process for making orthopedic bandages which comprises applying to a backing material such as a woven fabric, gauze and the like, a slurry of a melamine-formaldehyde resin, plaster of Paris and a binding agent with or without a polymerization catalyst; and to a suitable volatile dispersing medium for making the slurry. The backing material thus treated is then heated sufficiently to drive off the volatile material and to leave remaining on the gauze a coating of a mixture of the resin, plaster of Paris and binding agent with or without catalyst. Still further, this invention relates to a dry storage-stable composition of matter comprising a mixture of a dry, fusible, water-dispersible powdrous melamine-formaldehyde resin and a quantity of a catalytic material in a dry state which will not significantly effect or advance the polymerization of the resinous material while maintained in its dry state at room temperature but which will accelerate the polymerization of the fusible resin when moisture and/or heat for prolonged periods is applied thereto.

One of the objects of the present invention is to produce an orthopedic bandage comprising a gauze or other backing material coated with a dried mixture of a melamine resin, plaster of Paris, and a binding agent. A further object of the present invention is to produce an orthopedic bandage of the class described which when subjected to immersion in water may readily be applied to an animal or human subject for positioning and immobilization or support of a fractured, diseased or deformed part such as an arm or leg, which will set in a relatively short period of time and which will be useful as a cast to be worn by the living being as required. A further object of the present invention is to produce an orthopedic bandage which has the advantage of being stable under normal storage conditions and the further advantages of making a cast that is considerably lighter in weight, having greater strength and being more readily removable after use. A further object of the present invention is to produce a dry storage-stable composition of matter comprising a mixture of dry fusible water-soluble powdrous melamine-formaldehyde resin, with or without plaster of Paris, and a dry catalytic agent which catalytic agent is incapable of advancing measurably the state of polymerization of the resinous material while maintained in a dry state and at room temperature but being capable when in a moist state or when subjected to heat at a temperature above 300° F. of advancing the polymerization of the resinous material. These and other objects of the present invention will be discussed in greater detail hereinbelow.

It has been known for some time that orthopedic bandages may be prepared by coating gauze with plaster of Paris and utilizing the same after wetting in water to form a cast, for example, for a broken member of a living being in order that said broken member may be permitted to set and mend over a period of time, said member being undisturbed during that period. This prior art type of orthopedic bandage had certain outstanding disadvantages, principally the disadvantage of weight coupled with inadequate strength. It had the further disadvantages of being a cumbersome cast when completed and of being relatively very weak unless thoroughly dry. We have discovered that we can produce an orthopedic bandage which makes a cast that is waterproof, has improved strength at all stages after the cast is formed and set, less weight and less cumbersomeness and yet it can readily be applied and the setting of such a composition on the gauze bandage can be adjusted so that the set will be accomplished in a matter of a few minutes or with an opposite adjustment the set can be stretched out over a period of twenty minutes or longer. Ordinarily, however, it is desired that the cast reach a set condition within three to ten minutes after the time that the bandage has been immersed in the water.

In preparing the slurry which is subsequently applied to the woven material such as gauze in order to produce orthopedic bandages, one makes use of a water-dispersible, fusible melamine-formaldehyde resin having a mol ratio of melamine to formaldehyde between about 1:1.5 and 1:3.3, respectively, and preferably between 1:1.7 and 1:2.5, respectively. The amount of the resin that is present in the slurry should constitute about 5% to about 30% by weight based on the total solids in said slurry. Preferably one should have between about 10% to 20% by weight of the resin solids in the slurry based on the total weight of the solids in the slurry. Since the melamine-formaldehyde resin when dispersed in water would eventually advance in its polymerization to a point where it was no longer water dispersible and may if the temperature were elevated sufficiently advance in its polymerization to an insoluble and infusible state, we have discovered that if a considerable proportion of water is used as the volatile dispersing medium for the slurry, a catalyst sould not be incorporated into the slurry. On the other hand, if the dispersion medium is essentially nonaqueous in character, a catalyst may be incorporated into the slurry and the catalyst may be a water soluble catalyst such as those that are conventionally used in aqueous dispersions of melamine-formaldehyde resins. If one makes use of water, however, as the dispersion medium, one could apply the catalytic material to the surface of the dried bandage at a time when the water originally used as the medium had been driven therefrom by the application of heat.

In the prior art it had been conventional to obtain bandages of this general class by dipping orthopedic gauze bandages, having superimposed thereon and therein ordinary plaster of Paris, into aqueous solutions of the melamine resin and catalyst. It is obviously a desirable thing to be able to produce a bandage which would include all of the required ingredients in the bandage itself so that the normal procedure of dipping the bandage into plain water can be used. This is a much more convenient and a much more economical method since it eliminates the need for preparing a solution of resin and disposing of the residual solution containing a catalyst since such a solution will proceed in its polymerization and ultimately become unstable anyway. The attainment of the desired objective, however, is complicated with so many intricate considerations that it has previously been considered impossible to produce such a bandage that would contain thereon and therein all of the necessary ingredients and yet produce a bandage which was operative and useful in the desired purpose. The completed bandage must have in its content a melamine resin in such a form that it will dissolve or soften quickly when wet with water. On the other hand, the coating on the gauze or other backing material must be so bonded thereto that it does not dust off appreciably when dry and furthermore, that it be sufficiently anchored to the gauze or the backing so that no significant amount of the coating is lost during the wetting and squeezing-out steps preparatory to actual application of the bandage. It is furthermore necessary that the product wet thoroughly and quickly. The product must be stable in storage under normal conditions of temperature and humidity. The ordinary normal setting of the plaster of Paris must not be seriously interfered with. In the preparation of the bandage itself by applying the slurry to the gauze, the plaster of Paris must not be permitted to set or otherwise the final product would be useless. On the other hand, the melamine resin must not be permitted to polymerize significantly during the preparation of the bandage for if such is permitted, when the actual bandage is about to be placed into operation, the degree of polymerization of the resin will be such as to prevent its solubilization in water. Still further, this slurry used in manufacturing the bandage must not be too difficult to dry. By that it is meant that the volatile dispersion medium for the slurry must be one that is capable of drying in a few minutes in a current of air at a temperature not appreciably greater than about 260° F. in order that the bandage after being treated with the slurry may be reduced to a substantially dry state in a comparatively brief period of time without significantly advancing the degree of polymerization of the resin and further without significantly affecting the state of the plaster of Paris, for example by converting it in large part to anhydrous calcium sulfate.

These bandages in general may be prepared by spreading the slurry of the finely divided plaster of Paris, melamine resin, bonding agent (and catalyst whenever desirable) on a carrying material, usually a surgical gauze, and the slurry is applied by means of a knife coater or a reverse roll coater. When the slurry has been applied to the gauze, the solvent should be dried in a relatively short period of time by subjecting the coated gauze to a current of air at temperatures about 200 to 260° F. When the solvent has been substantially completely removed from the thus coated bandage, the gauze sheet may be slit to the desired width and packaged to yield the desired product. It is, of course, more economical to apply the slurry to large widths of the surgical gauze and after the drying operation has been completed to slit and package the individual bandages, but it can readily be seen that if desired the individual bandage strips may be subjected to the coating with the slurry and thereafter on drying may be rolled individually to produce the orthopedic bandage desired. Although plaster of Paris generally may be used in the practice of the process of the present invention, it is preferred to use a high density plaster of Paris of the fast-setting type, for instance, a calcium sulfate hemi-hydrate that has a setting time of about two to twelve minutes, and preferably one having a setting time of about two to four minutes. The plaster of Paris of the class desired is one which forms a pourable mixture with 32–42 cc.'s of water per hundred grams of plaster. Although any of the melamine-formaldehyde resins of the class described hereinabove may be used, it is desired that the resin be in a powdrous form so that the particles of the resin are within the range of 1 to 25 microns and preferably within the range of 1 to 5 microns. This is for the purpose of making it possible to soften quickly the resin but not necessarily to completely dissolve the resin and subsequently to dissolve the resin quickly when the bandage is wet with water to make a cast. Thereafter during the drying step, the particles of resin may stick together slightly with the plaster of Paris forming an open mesh structure or matrix into which water may readily penetrate and which presents a large surface for dissolving the resin when again wet. This has the additional advantage of giving the resin a bonding action to hold the coating on the gauze when the bandage is in the dry state such as during storage. If the temperatures used in drying the coated bandage when the dispersion medium or solvent is being driven off, are exceedingly high so that the polymerization of the resin is advanced significantly, the resultant bandage will be stiff, difficult to roll and furthermore difficult to wet with water for use. It can be seen from this that when temperatures in the order of magnitude of 200 to 260° F. are used the treated bandage should be removed from the dryer just as quickly as possible after the solvent has been substantially completely evaporated in order to avoid any over-heating.

It has been indicated hereinabove that it is desired to make use of what is commonly known as a wet binding agent which will serve the purpose of causing the plaster of Paris and the melamine resin to bind to the gauze material and diminish the tendency of the powdrous resin, plaster of Paris mixture from flaking or powdering off of the gauze when in a rolled state and particularly to prevent excessive loss of watering when the bandage is wet with water to make a cast. These wet binding agents should generally be used in amounts varying between about 0.5% and about 3.0% by weight based on the total solids in said slurry. It is preferred to use about 1.0% to 2% by weight of the binding agent based on the total weight of the solids in the slurry. These binding agents may be a water-insoluble material such as a polymerized methacrylate, such as polymethylmethacrylate, polyethylmethacrylate, polybutylmethacrylate, polymethylethacrylate, polyethylethacrylate, polybutylethacrylate or it may be any of the polymerized vinyl compounds such as polyvinyl acetate, polyvinyl chloride and polyvinyl acetals, such as the polyvinyl formal, polyvinyl acetal, polyvinyl butyral, or it may be a binding agent in the nature of a rubber latex, either natural or synthetic. The preferred binding agent is the polyvinyl acetate. Other binding agents may be used, particularly, to bind the coating to the dry bandage. These may be water-soluble materials such as methyl cellulose, polyvinyl alcohol, etc.

As a dispersing medium or solvent, we may use any of those solvents in which the components are soluble such as water alone or water in combination with the lower aliphatic alcohols with which water is miscible, such as ethanol, methanol, propanol, isopropanol, and the like. Amongst other solvents that may be used are ethylcellosolve, otherwise known as the monoethylether of ethylene glycol, or methylcellosolve, the monomethylether of ethylene glycol, amyl alcohol, hexyl alcohol, heptyl alcohol, cyclohexanol, cyclohexanone, ethylene glycol, diethylene glycol, propylene glycol, dipropylene glycol, glycerol, pentaerythritol, dipentaerythritol, and the like. Still further, one may make use of the aromatic hydrocarbons such as benzene, toluene, dimethylbenzene i. e. xylene, or the mineral spirits such as Varsol 1, Varsol 2, and the like. Wherever miscible with one another mixtures of two or more of these solvents may be used as the dispersing medium for the slurry. We may, however, use as the slurry solvent, water or water plus one of the lower aliphatic alcohols because of the economy of the operation. If one were to make use of the more expensive solvents, it would become necessary to increase the cost of production or to devise a method whereby the solvent could be recovered from the drying chamber. When water or a solvent such as water and methanol is used where the amount of water in the mixture is significant, by that it is meant in an amount greater than about 60%, measures must be taken to prevent the premature setting of the plaster of Paris during the preparation of the bandage. This can be accomplished by using a plaster set inhibitor, such as ammonium borate. These plaster set inhibitors such as ammonium borate will decompose during the drying of the coated bandage thus relieving the plaster of Paris of its inhibitor. We have discovered further that when the melamine resin is present in the slurry even when 40% methanol in water is used as the dispersing medium, the set of the plaster of Paris is inhibited to a considerable extent so that the plaster will not set for at least about 20 hours at room temperature, but in the absence of resin, the plaster will set in a 50% methanol solution in about a two hour period. As preferred dispersing mediums for the preparation of the slurry in the organic field, we could use a mixture of 80% toluene plus 20% of ethylcellosolve. Another preferred dispersing medium comprises 88% of toluene and 12% methylcellosolve, although mixtures of toluene and ethylcellosolve and methylcellosolve may be used. Another preferred organic dispersing medium would be 94% of isopropyl alcohol in water. For example, we select a 20% solution of ethylcellosolve in toluene because the melamine resin is softened therein, but not completely dissolved, so that the particles of resin stick together with the plaster during drying and assist in binding the coating to the gauze but yet produce a structure permitting ready wetting with water when the cast is to be made.

The proportion of solvent to the total solids in the slurry, namely, the resin, the plaster of Paris and the binding agent, must be such as to give a workable slurry. The slurry must be thinner when coated with a reverse roll coater than when a knife coater is used. Obviously, one could add an excess amount of solvent so as to make a virtually water-thin slurry but little is to be gained by such an approach as it would only necessitate an overwetting of the gauze material which would of course necessitate an expensive drying operation in order to get a desired concentration of the solids on the gauze. If the slurry on the other hand is not workable but is rather exceedingly viscous, it would be with difficulty that such a slurry would be applied to the gauze material particularly if a reverse roll coater were to be used in applying the slurry to the gauze. With a knife coater, however, the slurry should be as thick as possible in order to economize on dispersing medium and because thick slurry gives a better coating from the standpoint of being somewhat roughened and discontinuous so that it wets quickly when a roll of the bandage is immersed in water.

In order that the present invention may be more completely understood, the following examples are set forth in which all parts are parts by weight. These examples are set forth primarily for the purpose of illustration, and any specific enumeration of detail set forth therein should not be interpreted as a limitation on the case except as is indicated in the appended claims.

*Example 1*

25 parts of a high density, 2-minute setting-time plaster of Paris, 5.7 parts of a trimethylol melamine and 0.5 part of ammonium sulfate are mixed into 11.6 parts of a solvent comprising a mixture of 80 parts of toluene to every 20 parts of ethylcellosolve into which there is dissolved 0.28 part of polyvinyl acetate. After a thorough mixing at room temperature, this slurry is coated by a knife and roll coater as a discontinuous coating on a piece of surgical gauze with a mesh or thread count of 32 by 28 per square inch to give about 125 pounds of solids per thousand square feet of gauze. The coated gauze is dried by air at about 200 to about 250° F. in a tunnel drier over a period of about 0.75 to 1 minute. The product is a flexible, well-bonded product that wets quickly in water and produces a cast that is strong and water resistant.

*Example 2*

90 parts of a 2-minute, high-density plaster of Paris and 10 parts of a melamine-formaldehyde resin having a mol ratio of 1:2 melamine to formaldehyde, respectively, are mixed with 50 parts of water containing 0.6 part of boric acid, 0.4 part of concentrated ammonium hydroxide and 2 parts of an aqueous dispersion of polyvinyl acetate (50% dispersion). The mixture is spread on a piece of surgical gauze as in Example 1 to form a discontinuous coating in a concentration approximating about 100 pounds of solids per thousand square feet of gauze. The product is dried in a current of air at 200 to about 250° F. for about three minutes. The product is flexible and wets readily in 2% ammonium chloride solution to produce a desirable cast. If it is desired to facilitate the drying and to improve the flexibility of the bandage, a 1% quantity of finely divided light silica based on the melamine resin plus the plaster of Paris may be incorporated into the slurry. If it is further desired to give a smoother feel to the bandage, one may use about 1% of methyl cellulose in the slurry based on the total weight of the slurry solids. 2% of Carbowax 1500 may also be added if desired to increase the flexibility of the product.

*Example 3*

1800 parts of a 2-minute, high-density plaster of Paris is mixed with 200 grams of a melamine-formaldehyde resin having a mol ratio of 1:2, melamine to formaldehyde, respectively, and made into a slurry with 800 parts of a 40% by volume solution of methanol in water. The methanol solution contains about 30 parts of polyvinyl acetate in the form of a water dispersion. This mixture is formed into a slurry and is coated on a piece of surgical gauze as in Example 1 by a knife coater and is dried for about three minutes in a current of air at about 100° C. A flexible bandage is made which yields a good cast when wet in water. In order to permit the dipping of the bandage in water instead of in an ammonium chloride solution, the bandage coated with the slurry and dried may be further coated with ammonium sulfate to the extent of about 5% by weight of the melamine resin. The rough surface of the bandage permits the holding of the ammonium sulfate powder in the bandage when it is rolled up or the ammonium sulfate or other catalyst may be coated on the bandage, preferably while still warm from the dryer, in the form of a slurry in Carbowax. If it is desired to improve the flexibility of the bandage, it may be treated with Carbowax 1500 in amounts of 1–2% of the total solids. Carbowax is polyethylene glycol. The Carbowax 1500 has an average molecular weight of 1500. In order to make the bandage wet more readily and prevent blistering during drying, one could readily make use of a small amount (0.05 to 0.1%) of a wetting agent such as the Aerosol wetting agents, more specifically identified as Aerosol OT which is the dioctyl sodium sulfo succinate or Aerosol MA, the dihexyl sodium sulfosuccinate or the Aerosol AY, namely the diamyl sodium sulfosuccinate or the Aerosol IB, namely the di-isobutyl sodium sulfosuccinate.

*Example 4*

40 parts of Carbowax 1500 and 2 parts of Aerosol OT are dissolved in 800 parts of a 40% aqueous solution of methanol. 1800 parts of 2-minute, high-density plaster of Paris is mixed with 200 parts of a melamine-formaldehyde resin having a mol ratio of 1:2, melamine to formaldehyde, respectively, and this mixture is then dispersed in the 40% methanol solution prepared hereinabove. 18.2 parts of polyvinyl acetate in the form of an aqueous dispersion containing about 55% solids is then mixed into the slurry. The slurry is then coated on a surgical gauze and dried for about three minutes at about 212° F. The slurry dried readily and the resulting bandage was flexible, wetted well in water and yielded a good cast.

Example 5

A slurry is prepared by mixing 150 parts 2-minute low consistency plaster of Paris, 26 parts of a melamine-formaldehyde resin having a mol ratio of 1:2, melamine to formaldehyde, respectively, and 8 parts of a 25% solution of dioctyl sodium sulfosuccinate in water, 3.1 parts of a 55% aqueous suspension of polyvinyl acetate and 42 parts of a 70% methanol solution in water. The slurry is spread with a knife coater on 32 x 28 gauze, to give a dry bandage weighing 125-140 lbs. per 1000 square feet. The coated gauze is dried at 200-230° F. for about 2.2 minutes. The details of the slurry preparation are as follows: The polyvinyl acetate emulsion is added to the solvent first. The melamine resin is then added and stirred until dissolved. The Aerosol OT (dioctyl sodium sulfosuccinate) in water is then added and finally the plaster of Paris. The melamine resin is preferably added to the solvent before the plaster of Paris since it helps to prevent the premature setting of the plaster. If it is desired to spread the slurry into the gauze by means of a reverse roll coater, the slurry should be made thinner by the addition of more solvent. The viscosity of the slurry is not critical. A coating with better physical structure, namely one with a rough surface and having discontinuities, is obtained by use of a thick slurry. The Aerosol OT prevents the blistering of the coated gauze during the drying when a thick slurry is used.

Example 6

22 parts of melamine-formaldehyde resin having a mol ratio of 1:2, melamine to formaldehyde, respectively, and 100 parts of a 2-minute low consistency plaster of Paris are mixed together and are added to 45 parts of a 20% ethyl cellosolve solution in toluene together with 3.6 parts of ammonium chloride and 5 parts of a 50% polyvinyl acetate solution in toluene. The slurry is spread with a knife coater on a 32 x 28 gauze to give a dry bandage weighing 125-145 lbs. per 1000 square feet. The coated gauze is dried at 200-230° F. for about 0.75 minute. In this instance, the plaster of Paris and the melamine resin are mixed and then added to the solvent in order to avoid the lumping of the melamine resin. To accomplish this same effect, one could have added the plaster of Paris before the resin was added.

Example 7

Example 6 is repeated except that in the place of the 45 parts of the 20% ethyl cellosolve in toluene, there is added a comparable amount of a 30% solution of ethyl cellosolve in toluene. This different proportion of ethyl cellosolve in toluene softens and dissolves the melamine resin more readily and tends to give a harder coating on the bandage.

Example 8

1 part of a water insoluble polyvinyl acetate is dissolved in 36 parts of a dispersing medium comprising 80% toluene and 20% ethyl cellosolve. To this solvent, there is added 81 parts of a 12 to 18 minutes setting time, low consistency (high density) plaster of Paris, and is thoroughly mixed therein. Thereto there is added 16 parts of a melamine-formaldehyde resin having a mol ratio of 1:2, melamine to formaldehyde, respectively, 0.4 part of potassium sulfate, 1.06 parts of potassium chloride and 1 part of ammonium sulfate. The slurry is stirred at room temperature long enough to soften the resin. The slurry is spread with a knife coater on 32 x 28 gauze to give a dry bandage weighing 125-140 lbs. per 1000 square feet. The coated gauze is dried at 200-230° F. for about 2 minutes. An orthopedic bandage is thus produced having a rough surface with a plurality of discontinuities. In place of the potassium sulfate, 0.05 part of fresh, finely ground gypsum may be used.

The question of using certain catalysts for the purpose of polymerizing the melamine-formaldehyde resins in these orthopedic bandages has been discussed in some detail hereinabove. It has been mentioned that in non-aqueous solvent systems the catalyst may be incorporated in with the slurry; whereas, in the aqueous solvent systems it is desired to exclude the catalyst from the slurry but it has been indicated that in such a procedure it would be desirable to incorporate the catalyst on to the dried bandage by dusting the same with the powdrous catalyst prior to the rolling of the gauze into the bandage roll. For this purpose certain catalysts are not particularly desirable for use in this connection because if the rolls of bandage are to be stored for substantial periods of time in order of magnitude of more than six to twelve months, the catalyst would have an effect on the resin so as to advance the polymerization thereof even in a dry state to such a point that when the bandage was actually put into use it would be less effective than a comparable bandage which had, as a catalyst, a material which could be combined with the dry melamine-formaldehyde resin and still remain stable under storage conditions, under normal conditions of temperature and humidity. We have discovered as a further part of our invention that certain catalysts may be combined with the dry, water-soluble, fusible, powdrous resin and stored for prolonged periods of time without advancing significantly the polymerization of the resin. These catalysts are principally ammonium salts of certain organic and inorganic acids such as the ammonium sulfates or more specifically mono-ammonium sulfate and di-ammonium sulfate, the ammonium phosphates such as mono-ammonium phosphate, di-ammonium phosphate and tri-ammonium phosphate, mono-ammonium citrate, di-ammonium citrate, ammonium borate, mono-ammonium succinate, di-ammonium succinate, ammonium gluconate and the like. The catalytic materials may be added to the slurry in a non-aqueous system in amounts approximating about 0.1% to about 10% by weight and preferably 1% to 2% by weight based on the total weight of the resinous materials in the slurry. In the aqueous systems where the dry powdrous catalysts are dusted onto the prepared bandage in a dry state, the amounts would be the same, on the same basis. Obviously, combinations of these catalysts may be used whenever desired. It should be inferred from the foregoing that other catalysts conventionally used with melamine-formaldehyde resins could be used in this connection where the question of shelf life and storage stability is not of great concern. If the prepared bandage is expected to be used in a relatively short period of time after its manufacture, any of the conventional curing catalysts of the resin may be used in a dry state. It is only when it is expected that the bandages may be stored for prolonged periods of time, such as three months, six months, twelve months and longer that the catalysts used be such as those set forth specifically hereinabove. Catalysts such as ammonium chloride, ammonium bromide and the like may be used as long as storage temperature does not exceed 100° F. In order to illustrate the effect that these catalysts will have on the set time of plaster of Paris, the following is set forth wherein a fast-setting plaster is wet with a plurality of solutions, the control is one in which the solution is simply water, the remaining solutions will contain 2% of a catalyst. In certain instances a combination of catalysts will be used where one catalyst will have the effect of accelerating the cure of the resin whereas, the other catalyst used in combination therewith will have a pronounced tendency to retard the set of the plaster.

TABLE I—FAST SETTING PLASTER

| Solution Used to Wet the Plaster | Setting Time, minutes |
|---|---|
| (Control, in plain water) | 5-8 |
| 2% $(NH_4)_2SO_4$ in water | 1.5-3 |
| 1% $(NH_4)_2SO_4$ plus 1% $NH_4H_2PO_4$ in water | 29-30 |
| 1.8% $(NH_4)_2SO_4$ plus 0.2% $NH_4H_2PO_4$ in water | 6-9 |
| 1.9% $(NH_4)_2SO_4$ plus 0.1% $NH_4H_2PO_4$ in water | 4-6 |
| 2% $NH_4Cl$ in 35% resin solution | 4-7 |
| 2% $(NH_4)_2SO_4$ in 35% resin solution | 2.5 |
| 1.8% $(NH_4)_2SO_4$ plus 0.2% $NH_4H_2PO_4$ in 35% resin solution | 25 |
| 1.94% $(NH_4)_2SO_4$ plus 0.06% $NH_4H_2PO_4$ in 35% resin solution | 4-7 |
| 1.96% $(NH_4)_2SO_4$ plus 0.04% $NH_4HB_4O_7.3H_2O$ in 35% resin solution | 3-6 |
| 1.96% $(NH_4)_2SO_4$ plus 0.04% ammonium acid citrate in 35% resin solution | 8.5 |
| 1.96% $(NH_4)_2SO_4$ plus 0.04% ammonium acid succinate in 35% resin solution | 3 |
| 1.7% $(NH_4)_2SO_4$ plus 0.03% ammonium acid succinate in 35% resin solution | 14 |
| 1.96% $(NH_4)_2SO_4$ plus 0.04% ammonium gluconate in 35% resin solution | 3 |
| 1.7% $(NH_4)_2SO_4$ plus 0.3% ammonium gluconate in 35% resin solution | 4 |
| 1.3% ammonium fluosilicate plus 0.7% $NH_4H_2PO_4$ in a 35% resin solution | 4-6 |

If a slower setting plaster of Paris is used, such as one that will set in about 21-31 minutes in water after having been wetted by water alone, the modification of setting time would be accomplished as indicated in the table set forth hereinbelow.

TABLE II—SLOW SETTING PLASTER

| Solution Used to Wet the Plaster of Paris | Setting Time, minutes |
|---|---|
| Control in water | 21-31 |
| 2% $(NH_4)_2SO_4$ in 35% resin solution | 7 |
| 1.9% $(NH_4)_2SO_4$ plus 0.1% of $NH_4H_2PO_4$ in 35% resin solution | 20-25 |
| 2% ammonium fluosilicate in 35% resin solution | 12.5 |
| 1.6% ammonium fluosilicate plus 0.4% ammonium succinate in 35% resin solution | 37 |
| 1.6% ammonium fluosilicate plus 0.4% ammonium gluconate in 35% resin solution | 20 |

It can be seen from this that a slower setting plaster of Paris or a faster setting plaster of Paris may be used. Still further, it can be seen that the actual setting time of the plaster of Paris resin mixture can be adjusted to whatever setting time is desired.

In the preparation of these melamine resin plaster of Paris bandages, it is preferred to use a high-density plaster of Paris which is characterized particularly by its so-called consistency. A low consistency plaster of Paris is one that requires only a small proportion of water in order to make a pourable mix. The consistency is the number of cubic centimeters of water required to be mixed with 100 grams of the plaster of Paris in order to get a mix that will just pour out of a cup. The details of this determination are described as the U. S. Gypsum patty method for pouring consistency, U. S. Gypsum Company Bulletin I. G. L. No. 19. When the relative proportion of water to plaster is low, there is less water to evaporate in drying the cast and a more dense cast is produced, thus the strength is better both wet and dry. The consistency of plasters that we prefer to use ranges from about 32 to 42 cc. of water per 100 grams of plaster. It is preferred to use a plaster of Paris having a consistency not significantly less than 30 cc. of water per 100 grams of plaster of Paris.

It has been indicated hereinabove that catalysts and combinations of catalysts may be used with the melamine resins. The use of the combination of KCl and $(NH_4)_2SO_4$ in a non-aqueous solvent and in a dry bandage is very stable. Upon wetting, however, these two salts dissolve and ionize to give the equivalent of $K_2SO_4$ and $NH_4Cl$. The former accelerates the plaster set while the latter provides an excellent catalyst for the resin. Fresh ground gypsum may be used in catalytic amounts to accelerate the set of the plaster of Paris. When the catalyst is present in amounts greater than 10%, namely 15% or more, it tends to slow down the hardening of the cast. The gypsum overcomes this tendency when large amounts of catalyst are used to accelerate the cure of melamine resin. Thus by using maximum amounts of catalyst and fresh ground gypsum we can get fast cure of resin and fast hardening of the cast. In the place of the KCl, any of the chloride salts of the alkaline or alkaline earth metals may be used such as sodium, barium, calcium, and the like.

We claim:

1. A process for making a material for making an orthopedic cast which comprises applying to a gauze bandage, a non-aqueous slurry of an uncured melamine-formaldehyde resin, plaster of Paris, an adhesive binding agent, a catalyst for the resin, and a volatile dispersing medium for said adhesive binding agent, heating the resulting gauze bandage to a substantially dry state at a temperature not appreciably greater than 260° F., without appreciably increasing the degree of polymerization of the resin, wherein said melamine resin is a fusible water dispersible material having a mol ratio of 1:1.5 to 1:3.3, melamine to formaldehyde, respectively, wherein said resin constitutes about 5% to 30% by weight of the total solids in said slurry, wherein the binding agent constitutes between about 0.5% to 3.0% by weight of the total solids of said slurry, wherein said plaster of Paris constitutes the balance of solids of said slurry and wherein said volatile medium is present in an amount sufficient to enable said solids to form a coatable slurry therewith.

2. A material for making an orthopedic cast which comprises a flexible backing fabric coated with a dry mixture of about 60 to 95% by weight of a powdrous plaster of Paris, 5% to 30% by weight of an uncured water soluble melamine-formaldehyde resin having a mol ratio of 1:1.5 to 1:3.3, melamine to formaldehyde, respectively, adhesive binding agent and catalyst for the resin, said percentages being based on the total weight of the resin solids and plaster of Paris, the amount of the adhesive binding agent being 0.5% to 3.0%, based on the total weight of the mixture, and the amount of catalyst being 0.1% to 10% based on the weight of the resin.

3. A material for making an orthopedic cast which comprises a flexible backing fabric coated with a dry mixture of about 60 to 95% by weight of a powdrous plaster of Paris, 5% to 30% by weight of an uncured water soluble melamine-formaldehyde resin having a mol ratio of 1:1.5 to 1:3.3, melamine to formaldehyde, respectively, adhesive binding agent and catalyst for the resin, said percentages being based on the total weight of the resin solids and plaster of Paris, the amount of the adhesive binding agent being 0.5% to 3.0%, based on the total weight of the mixture, and the amount of catalyst being 1% to 5% based on the weight of the resin.

4. A material for making an orthopedic cast which comprises a flexible backing fabric coated with a dry mixture of about 80% to 90% by weight of a powdrous plaster of Paris, 10% to 20% by weight of an uncured water soluble melamine-formaldehyde resin having a mol ratio of 1:1.5 to 1:3.3, melamine to formaldehyde, respectively, adhesive binding agent and catalyst for the resin, said percentages being based on the total weight of the resin solids and plaster of Paris, the amount of the adhesive binding agent being 1% to 2%, based on the total weight of the mixture, and the amount of catalyst being 1% to 5% based on the weight of the resin.

5. A material for making an orthopedic cast which comprises a flexible backing fabric coated with a dry mixture of about 80% to 90% by weight of a powdrous plaster of Paris, 10% to 20% by weight of an uncured water soluble melamine-formaldehyde resin having a mol ratio of 1:1.7 to 1:2.5, melamine to formaldehyde, respectively, adhesive binding agent and catalyst for the resin, said percentages being based on the total weight of the resin solids and plaster of Paris, the amount of the adhesive binding agent being 1% to 2%, based on the total weight of the mixture, and the amount of catalyst being 1% to 5% based on the weight of the resin.

References Cited in the file of this patent

UNITED STATES PATENTS

| | | |
|---|---|---|
| 2,088,227 | Battye et al | July 27, 1937 |
| 2,419,440 | Delmonte | Apr. 22, 1947 |
| 2,557,083 | Eberl | June 19, 1951 |
| 2,571,343 | Dailey | Oct. 6, 1951 |

FOREIGN PATENTS

| | | |
|---|---|---|
| 480,316 | Great Britain | Feb. 17, 1938 |
| 583,471 | Great Britain | Dec. 19, 1946 |